(12) United States Patent
Vinberg et al.

(10) Patent No.: US 7,689,676 B2
(45) Date of Patent: Mar. 30, 2010

(54) MODEL-BASED POLICY APPLICATION

(75) Inventors: Anders B. Vinberg, Kirkland, WA (US); Bruce W. Copeland, Redmond, WA (US); Robert Fries, Redmond, WA (US); Kevin D. J. Grealish, Seattle, WA (US); Jonathan C. Hardwick, Kirkland, WA (US); Michael J. Healy, Redmond, WA (US); Galen C. Hunt, Bellevue, WA (US); Aamer Hydrie, Seattle, WA (US); David C. James, Bothell, WA (US); Anand Lakshminarayanan, Redmond, WA (US); Edwin R. Lassettre, Redmond, WA (US); Raymond W. McCollum, Redmond, WA (US); Rob Mensching, Redmond, WA (US); Mazhar Mohammed, Sammamish, WA (US); Rajagopalan Badri Narayanan, Redmond, WA (US); Geoffrey H. Outhred, Seattle, WA (US); Zhengkai Kenneth Pan, Redmond, WA (US); Efstathios Papaefstathiou, Redmond, WA (US); John M. Parchem, Seattle, WA (US); Vij Rajarajan, Issaquah, WA (US); Ashvinkumar J. Sanghvi, Sammamish, WA (US); Bassam Tabbara, Seattle, WA (US); Rene Antonio Vega, Kirkland, WA (US); Vitaly Voloshin, Issaquah, WA (US); Robert V. Welland, Seattle, WA (US); John H. Wilson, Woodinville, WA (US); Eric J. Winner, Woodinville, WA (US); Jeffrey A. Woolsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 41 days.

(21) Appl. No.: 11/622,978

(22) Filed: Jan. 12, 2007
(Under 37 CFR 1.47)

(65) Prior Publication Data
US 2008/0059214 A1    Mar. 6, 2008

Related U.S. Application Data

(63) Continuation of application No. 11/427,041, filed on Jun. 28, 2006, now abandoned, which is a continuation-in-part of application No. 11/170,700, filed on Jun. 29, 2005, which is a continuation-in-part of application No. 10/693,838, filed on Oct. 24, 2003.

(60) Provisional application No. 60/452,736, filed on Mar. 6, 2003.

(51) Int. Cl.
G06F 15/177 (2006.01)
G06F 15/173 (2006.01)
G06F 9/44 (2006.01)

(52) U.S. Cl. ............... 709/220; 709/221; 709/223; 703/20; 703/21; 715/734; 715/735; 715/736

(58) Field of Classification Search ................. 709/220, 709/221, 223; 703/20, 21; 715/734, 735, 715/736
See application file for complete search history.

(56) References Cited

U.S. PATENT DOCUMENTS

| | | |
|---|---|---|
| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |
| 5,220,621 A | 6/1993 | Saitoh |
| 5,430,810 A | 7/1995 | Saeki |
| 5,490,276 A | 2/1996 | Doli, Jr. et al. |
| 5,499,357 A | 3/1996 | Sonty et al. |
| 5,504,921 A | 4/1996 | Dev et al. |
| 5,557,774 A | 9/1996 | Shimabukuro et al. |
| 5,579,482 A | 11/1996 | Einkauf et al. |
| 5,668,995 A | 9/1997 | Bhat |
| 5,686,940 A | 11/1997 | Kuga |
| 5,724,508 A | 3/1998 | Harple, Jr. et al. |

| Patent | Date | Inventor |
|---|---|---|
| 5,748,958 A | 5/1998 | Badovinatz et al. |
| 5,758,351 A | 5/1998 | Gibson et al. |
| 5,768,271 A | 6/1998 | Seid et al. |
| 5,774,689 A | 6/1998 | Curtis et al. |
| 5,784,463 A | 7/1998 | Chen et al. |
| 5,790,895 A | 8/1998 | Krontz et al. |
| 5,818,937 A | 10/1998 | Watson et al. |
| 5,822,531 A | 10/1998 | Gorczyca et al. |
| 5,826,015 A | 10/1998 | Schmidt |
| 5,845,124 A | 12/1998 | Berman |
| 5,845,277 A | 12/1998 | Pfeil et al. |
| 5,867,706 A | 2/1999 | Martin et al. |
| 5,872,928 A * | 2/1999 | Lewis et al. ............... 709/222 |
| 5,878,220 A | 3/1999 | Olkin et al. |
| 5,895,499 A | 4/1999 | Chu |
| 5,905,728 A | 5/1999 | Han et al. |
| 5,917,730 A | 6/1999 | Rittie et al. |
| 5,930,798 A | 7/1999 | Lawler et al. |
| 5,958,009 A | 9/1999 | Friedrich et al. |
| 5,968,126 A | 10/1999 | Ekstrom et al. |
| 6,035,405 A | 3/2000 | Gage et al. |
| 6,041,054 A | 3/2000 | Westberg |
| 6,047,323 A | 4/2000 | Krause |
| 6,049,528 A | 4/2000 | Hendel et al. |
| 6,052,469 A | 4/2000 | Johnson et al. |
| 6,059,842 A | 5/2000 | Dumarot et al. |
| 6,065,058 A | 5/2000 | Hailpern et al. |
| 6,075,776 A | 6/2000 | Tanimoto et al. |
| 6,076,108 A | 6/2000 | Courts et al. |
| 6,081,826 A | 6/2000 | Masuoka et al. |
| 6,085,238 A | 7/2000 | Yuasa et al. |
| 6,086,618 A | 7/2000 | Al-Hilali et al. |
| 6,108,702 A | 8/2000 | Wood |
| 6,112,243 A | 8/2000 | Downs et al. |
| 6,115,393 A | 9/2000 | Engel et al. |
| 6,118,785 A | 9/2000 | Araujo et al. |
| 6,125,442 A | 9/2000 | Maves et al. |
| 6,125,447 A | 9/2000 | Gong |
| 6,134,594 A | 10/2000 | Helland et al. |
| 6,147,995 A | 11/2000 | Dobbins et al. |
| 6,151,688 A | 11/2000 | Wipfel et al. |
| 6,167,052 A | 12/2000 | McNeill et al. |
| 6,167,383 A | 12/2000 | Henson |
| 6,178,529 B1 | 1/2001 | Short et al. |
| 6,182,275 B1 | 1/2001 | Beelitz et al. |
| 6,192,401 B1 | 2/2001 | Modiri et al. |
| 6,195,091 B1 | 2/2001 | Harple et al. |
| 6,195,355 B1 | 2/2001 | Demizu |
| 6,208,345 B1 | 3/2001 | Sheard et al. |
| 6,208,649 B1 | 3/2001 | Kloth |
| 6,209,099 B1 | 3/2001 | Saunders |
| 6,212,559 B1 | 4/2001 | Bixler et al. |
| 6,226,788 B1 | 5/2001 | Schoening et al. |
| 6,230,312 B1 | 5/2001 | Hunt |
| 6,233,610 B1 | 5/2001 | Hayball et al. |
| 6,236,365 B1 | 5/2001 | LeBlanc et al. |
| 6,236,901 B1 | 5/2001 | Goss |
| 6,253,230 B1 | 6/2001 | Couland et al. |
| 6,256,773 B1 | 7/2001 | Bowman-Amuah |
| 6,259,448 B1 | 7/2001 | McNally et al. |
| 6,263,089 B1 | 7/2001 | Otsuka et al. |
| 6,266,707 B1 | 7/2001 | Boden et al. |
| 6,269,076 B1 | 7/2001 | Shamir et al. |
| 6,269,079 B1 | 7/2001 | Marin et al. |
| 6,305,015 B1 | 10/2001 | Akriche et al. |
| 6,311,144 B1 | 10/2001 | Abu El Ata |
| 6,311,270 B1 | 10/2001 | Challener et al. |
| 6,330,605 B1 | 12/2001 | Christensen et al. |
| 6,336,138 B1 | 1/2002 | Caswell et al. |
| 6,338,112 B1 | 1/2002 | Wipfel et al. |
| 6,351,685 B1 | 2/2002 | Dimitri et al. |
| 6,353,861 B1 | 3/2002 | Dolin, Jr. et al. |
| 6,353,898 B1 | 3/2002 | Wipfel et al. |
| 6,360,265 B1 | 3/2002 | Falck et al. |
| 6,367,010 B1 | 4/2002 | Venkatram et al. |
| 6,370,573 B1 | 4/2002 | Bowman-Amuah |
| 6,370,584 B1 | 4/2002 | Bestavros et al. |
| 6,377,996 B1 | 4/2002 | Lumelsky et al. |
| 6,389,464 B1 | 5/2002 | Krishnamurthy et al. |
| 6,393,386 B1 | 5/2002 | Zager et al. |
| 6,393,456 B1 | 5/2002 | Ambler et al. |
| 6,393,474 B1 | 5/2002 | Eichert et al. |
| 6,393,485 B1 | 5/2002 | Chao et al. |
| 6,408,390 B1 | 6/2002 | Saito |
| 6,424,718 B1 | 7/2002 | Holloway |
| 6,424,992 B2 | 7/2002 | Devarakonda et al. |
| 6,427,163 B1 | 7/2002 | Arendt et al. |
| 6,427,171 B1 | 7/2002 | Craft et al. |
| 6,438,100 B1 | 8/2002 | Halpern et al. |
| 6,442,557 B1 | 8/2002 | Buteau et al. |
| 6,442,713 B1 | 8/2002 | Block et al. |
| 6,449,650 B1 * | 9/2002 | Westfall et al. ............ 709/228 |
| 6,457,048 B2 | 9/2002 | Sondur et al. |
| 6,463,536 B2 | 10/2002 | Saito |
| 6,466,985 B1 | 10/2002 | Goyal et al. |
| 6,470,025 B1 | 10/2002 | Wilson et al. |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,502,131 B1 * | 12/2002 | Vaid et al. ................. 709/224 |
| 6,505,244 B1 | 1/2003 | Natarajan et al. |
| 6,519,615 B1 | 2/2003 | Wollrath et al. |
| 6,529,953 B1 | 3/2003 | Van Renesse |
| 6,539,494 B1 | 3/2003 | Abramson et al. |
| 6,546,423 B1 | 4/2003 | Dutta et al. |
| 6,546,553 B1 | 4/2003 | Hunt |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,584,499 B1 | 6/2003 | Jantz et al. |
| 6,587,876 B1 | 7/2003 | Mahon et al. |
| 6,597,956 B1 | 7/2003 | Aziz et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,601,233 B1 | 7/2003 | Underwood |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,651,240 B1 | 11/2003 | Yamamoto et al. |
| 6,654,782 B1 | 11/2003 | O'Brien et al. |
| 6,654,796 B1 | 11/2003 | Slater et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |
| 6,691,148 B1 | 2/2004 | Zinky et.al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |

| Patent | Kind | Date | Inventor |
|---|---|---|---|
| 6,738,736 | B1 | 5/2004 | Bond |
| 6,741,266 | B1 | 5/2004 | Kamiwada et al. |
| 6,742,020 | B1 | 5/2004 | Dimitroff et al. |
| 6,748,447 | B1 | 6/2004 | Basani et al. |
| 6,754,716 | B1 | 6/2004 | Sharma et al. |
| 6,754,816 | B1 | 6/2004 | Layton et al. |
| 6,757,744 | B1 | 6/2004 | Narisi et al. |
| 6,760,765 | B1 | 7/2004 | Asai et al. |
| 6,760,775 | B1 | 7/2004 | Anerousis et al. |
| 6,769,008 | B1 | 7/2004 | Kumar et al. |
| 6,769,060 | B1 | 7/2004 | Dent et al. |
| 6,779,016 | B1 | 8/2004 | Aziz et al. |
| 6,782,408 | B1 | 8/2004 | Chandra et al. |
| 6,789,090 | B1 | 9/2004 | Miyake et al. |
| 6,801,528 | B2 | 10/2004 | Nassar |
| 6,801,937 | B1 | 10/2004 | Novaes et al. |
| 6,813,778 | B1 | 11/2004 | Poli et al. |
| 6,816,897 | B2 | 11/2004 | McGuire |
| 6,820,042 | B1 | 11/2004 | Cohen et al. |
| 6,820,121 | B1 | 11/2004 | Callis et al. |
| 6,823,299 | B1 | 11/2004 | Contreras et al. |
| 6,823,373 | B1 | 11/2004 | Pancha et al. |
| 6,823,382 | B2 | 11/2004 | Stone |
| 6,829,639 | B1 | 12/2004 | Lawson et al. |
| 6,829,770 | B1 | 12/2004 | Hinson et al. |
| 6,836,750 | B2 | 12/2004 | Wong et al. |
| 6,845,160 | B1 | 1/2005 | Aoki |
| 6,853,841 | B1 | 2/2005 | St. Pierre |
| 6,854,069 | B2 | 2/2005 | Kampe et al. |
| 6,856,591 | B1 | 2/2005 | Ma et al. |
| 6,862,613 | B1 | 3/2005 | Kumar et al. |
| 6,868,062 | B1 | 3/2005 | Yadav et al. |
| 6,868,454 | B1 | 3/2005 | Kubota et al. |
| 6,879,926 | B2 | 4/2005 | Schmit et al. |
| 6,880,002 | B2 | 4/2005 | Hirschfeld et al. |
| 6,886,038 | B1 | 4/2005 | Tabbara et al. |
| 6,888,807 | B2 | 5/2005 | Heller et al. |
| 6,895,534 | B2 | 5/2005 | Wong et al. |
| 6,898,791 | B1 | 5/2005 | Chandy et al. |
| 6,904,458 | B1 | 6/2005 | Bishop et al. |
| 6,907,395 | B1 | 6/2005 | Hunt et al. |
| 6,912,568 | B1 | 6/2005 | Nishiki et al. |
| 6,915,338 | B1 | 7/2005 | Hunt et al. |
| 6,922,791 | B2 | 7/2005 | Mashayekhi et al. |
| 6,928,482 | B1 | 8/2005 | Ben Nun et al. |
| 6,944,183 | B1 | 9/2005 | Iyer et al. |
| 6,944,759 | B1 | 9/2005 | Crisan |
| 6,947,987 | B2 | 9/2005 | Boland |
| 6,954,930 | B2 | 10/2005 | Drake et al. |
| 6,957,186 | B1 | 10/2005 | Guheen et al. |
| 6,963,981 | B1 | 11/2005 | Bailey et al. |
| 6,968,291 | B1 | 11/2005 | Desai |
| 6,968,535 | B2 | 11/2005 | Stelting et al. |
| 6,968,550 | B2 | 11/2005 | Branson et al. |
| 6,968,551 | B2 | 11/2005 | Hediger et al. |
| 6,971,063 | B1 | 11/2005 | Rappaport et al. |
| 6,971,072 | B1 | 11/2005 | Stein |
| 6,973,620 | B2 | 12/2005 | Gusler et al. |
| 6,973,622 | B1 | 12/2005 | Rappaport et al. |
| 6,976,079 | B1 | 12/2005 | Ferguson et al. |
| 6,976,269 | B1 | 12/2005 | Avery, IV et al. |
| 6,978,379 | B1 * | 12/2005 | Goh et al. .................. 726/10 |
| 6,983,317 | B1 | 1/2006 | Bishop et al. |
| 6,985,956 | B2 | 1/2006 | Luke et al. |
| 6,986,135 | B2 | 1/2006 | Leathers et al. |
| 6,990,666 | B2 | 1/2006 | Hirschfeld et al. |
| 7,003,562 | B2 | 2/2006 | Mayer |
| 7,003,574 | B1 | 2/2006 | Bahl |
| 7,012,919 | B1 | 3/2006 | So et al. |
| 7,013,462 | B2 | 3/2006 | Zara et al. |
| 7,016,950 | B2 | 3/2006 | Tabbara et al. |
| 7,024,451 | B2 | 4/2006 | Jorgenson |
| 7,027,412 | B2 | 4/2006 | Miyamoto et al. |
| 7,028,228 | B1 | 4/2006 | Lovy et al. |
| 7,035,786 | B1 | 4/2006 | Abu El Ata et al. |
| 7,035,930 | B2 * | 4/2006 | Graupner et al. .......... 709/226 |
| 7,043,407 | B2 | 5/2006 | Lynch et al. |
| 7,043,545 | B2 | 5/2006 | Tabbara et al. |
| 7,046,680 | B1 | 5/2006 | McDysan et al. |
| 7,050,961 | B1 | 5/2006 | Lee et al. |
| 7,054,943 | B1 | 5/2006 | Goldszmidt et al. |
| 7,058,704 | B1 | 6/2006 | Mangipudi et al. |
| 7,058,826 | B2 | 6/2006 | Fung |
| 7,058,858 | B2 | 6/2006 | Wong et al. |
| 7,062,718 | B2 | 6/2006 | Kodosky et al. |
| 7,069,204 | B1 | 6/2006 | Solden et al. |
| 7,069,480 | B1 | 6/2006 | Lovy et al. |
| 7,069,553 | B2 | 6/2006 | Narayanaswamy et al. |
| 7,072,807 | B2 | 7/2006 | Brown et al. |
| 7,072,822 | B2 | 7/2006 | Humenansky et al. |
| 7,076,633 | B2 | 7/2006 | Tormasov et al. |
| 7,080,143 | B2 | 7/2006 | Hunt et al. |
| 7,082,464 | B2 | 7/2006 | Hasan et al. |
| 7,089,281 | B1 | 8/2006 | Kazemi et al. |
| 7,089,293 | B2 | 8/2006 | Grosner et al. |
| 7,089,530 | B1 | 8/2006 | Dardinski et al. |
| 7,093,005 | B2 | 8/2006 | Patterson |
| 7,093,288 | B1 | 8/2006 | Hydrie et al. |
| 7,096,258 | B2 | 8/2006 | Hunt et al. |
| 7,099,936 | B2 | 8/2006 | Chase et al. |
| 7,103,185 | B1 | 9/2006 | Srivastava et al. |
| 7,103,874 | B2 | 9/2006 | McCollum et al. |
| 7,113,900 | B1 | 9/2006 | Hunt et al. |
| 7,117,158 | B2 | 10/2006 | Weldon et al. |
| 7,117,261 | B2 | 10/2006 | Kryskow, Jr. et al. |
| 7,120,154 | B2 | 10/2006 | Bavant et al. |
| 7,124,289 | B1 | 10/2006 | Suorsa |
| 7,127,625 | B2 | 10/2006 | Farkas et al. |
| 7,131,123 | B2 | 10/2006 | Suorsa et al. |
| 7,134,011 | B2 | 11/2006 | Fung |
| 7,134,122 | B1 | 11/2006 | Sero et al. |
| 7,139,930 | B2 | 11/2006 | Mashayekhi et al. |
| 7,139,999 | B2 | 11/2006 | Bowman-Amuah |
| 7,143,420 | B2 | 11/2006 | Radhakrishnan |
| 7,146,353 | B2 | 12/2006 | Garg et al. |
| 7,150,015 | B2 | 12/2006 | Pace et al. |
| 7,152,109 | B2 | 12/2006 | Suorsa et al. |
| 7,152,157 | B2 | 12/2006 | Murphy et al. |
| 7,155,380 | B2 | 12/2006 | Hunt et al. |
| 7,155,490 | B1 | 12/2006 | Malmer et al. |
| 7,162,427 | B1 | 1/2007 | Myrick et al. |
| 7,162,509 | B2 | 1/2007 | Brown et al. |
| 7,174,379 | B2 | 2/2007 | Agarwal et al. |
| 7,181,731 | B2 | 2/2007 | Pace et al. |
| 7,188,335 | B1 | 3/2007 | Darr et al. |
| 7,191,344 | B2 | 3/2007 | Lin et al. |
| 7,191,429 | B2 | 3/2007 | Brassard et al. |
| 7,194,439 | B2 | 3/2007 | Kassan et al. |
| 7,194,616 | B2 | 3/2007 | Axnix et al. |
| 7,197,418 | B2 | 3/2007 | Fuller, III et al. |
| 7,200,530 | B2 | 4/2007 | Brown et al. |
| 7,200,655 | B2 | 4/2007 | Hunt et al. |
| 7,203,911 | B2 | 4/2007 | Williams |
| 7,210,143 | B2 | 4/2007 | Or et al. |
| 7,213,231 | B1 | 5/2007 | Bandhole et al. |
| 7,222,147 | B1 | 5/2007 | Black et al. |
| 7,225,441 | B2 | 5/2007 | Kozuch et al. |
| 7,231,410 | B1 | 6/2007 | Walsh et al. |
| 7,254,634 | B1 | 8/2007 | Davis et al. |
| 7,257,584 | B2 | 8/2007 | Hirschfeld et al. |
| 7,275,156 | B2 | 9/2007 | Balfanz et al. |
| 7,278,273 | B1 | 10/2007 | Whitted et al. |
| 7,281,154 | B2 | 10/2007 | Mashayekhi et al. |
| 7,302,608 | B1 | 11/2007 | Acharya et al. |
| 7,305,549 | B2 | 12/2007 | Hunt et al. |
| 7,305,561 | B2 | 12/2007 | Hunt et al. |

| | | |
|---|---|---|
| 7,313,573 B2 | 12/2007 | Leung et al. |
| 7,315,801 B1 * | 1/2008 | Dowd et al. .................. 703/13 |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,376,125 B1 | 5/2008 | Hussain et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,461,249 B1 | 12/2008 | Pearson et al. |
| 7,464,147 B1 | 12/2008 | Fakhouri et al. |
| 7,624,086 B2 | 11/2009 | Keith, Jr. |
| 2001/0014158 A1 | 8/2001 | Baltzley |
| 2001/0016909 A1 | 8/2001 | Gehrmann |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0184327 A1 | 12/2002 | Major et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028642 A1 | 2/2003 | Agarwal et al. |
| 2003/0028770 A1 | 2/2003 | Litwin, Jr. et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voipano |
| 2003/0126464 A1 | 7/2003 | McDaniel et al. |
| 2003/0130833 A1 | 7/2003 | Brownell et al. |
| 2003/0138105 A1 | 7/2003 | Challener et al. |
| 2003/0165140 A1 | 9/2003 | Tang et al. |
| 2003/0200293 A1 | 10/2003 | Fearn et al. |
| 2003/0204734 A1 | 10/2003 | Wheeler |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0049365 A1 | 3/2004 | Keller et al. |
| 2004/0059812 A1 | 3/2004 | Assa |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0208292 A1 | 10/2004 | Winterbottom |
| 2004/0226010 A1 | 11/2004 | Suorsa |
| 2004/0261079 A1 | 12/2004 | Sen |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 * | 1/2005 | Williams et al. ............ 370/352 |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102388 A1 | 5/2005 | Tabbara et al. |
| 2005/0102513 A1 | 5/2005 | Alve |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0246771 A1 | 11/2005 | Hunt et al. |
| 2005/0251783 A1 | 11/2005 | Torone et al. |
| 2005/0257244 A1 | 11/2005 | Joly et al. |
| 2005/0268325 A1 | 12/2005 | Kuno et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 | 2/2006 | Vinberg et al. |
| 2006/0048017 A1 | 3/2006 | Anerousis et al. |
| 2006/0123040 A1 | 6/2006 | McCarthy et al. |
| 2006/0149838 A1 | 7/2006 | Hunt et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0232927 A1 | 10/2006 | Vinberg et al. |
| 2006/0235664 A1 | 10/2006 | Vinberg et al. |
| 2006/0259609 A1 | 11/2006 | Hunt et al. |
| 2006/0259610 A1 | 11/2006 | Hunt et al. |
| 2006/0271341 A1 | 11/2006 | Brown et al. |
| 2007/0006177 A1 | 1/2007 | Aiber et al. |
| 2007/0112847 A1 | 5/2007 | Dublish et al. |
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| CN | 1368694 | 9/2002 |
| CN | 1375685 | 10/2002 |
| EP | 0964546 | 12/1999 |
| EP | 1180886 A1 | 2/2002 |

| | | |
|---|---|---|
| EP | 1307018 A1 | 5/2003 |
| JP | 8297567 | 11/1996 |
| JP | 11007407 | 1/1999 |
| JP | 11340980 (A) | 12/1999 |
| JP | 2000293497 (A) | 10/2000 |
| JP | 2001339437 (A) | 12/2001 |
| JP | 2001526814 | 12/2001 |
| JP | 2002084302 | 3/2002 |
| JP | 2002354006 (A) | 12/2002 |
| JP | 2003532784 | 11/2003 |
| JP | 2005155729 | 6/2005 |
| KR | 10-2002-0026751 | 4/2002 |
| KR | 10-2004-0008275 | 1/2004 |
| RU | 2156546 (C2) | 9/2000 |
| RU | 2189073 (C2) | 9/2002 |
| WO | WO9728505 (A1) | 8/1997 |
| WO | WO9853410 | 11/1998 |
| WO | WO9963439 | 2/1999 |
| WO | WO9930514 (A2) | 6/1999 |
| WO | WO0022526 | 4/2000 |
| WO | WO0031945 | 6/2000 |
| WO | WO0073929 | 12/2000 |
| WO | WO0230044 (A2) | 4/2002 |
| WO | WO0237748 | 5/2002 |
| WO | WO02085051 | 10/2002 |
| WO | WO03027876 (A1) | 4/2003 |
| WO | WO03039104 | 5/2003 |

OTHER PUBLICATIONS

Dekhil, et al., "Generalized Policy Model for Application and Service Management", Hewlett-Packard Laboratories, Software Technology Lab, 3 pages.

Garschhammer, et al., "Towards generic Service Management Concepts A Service Model Based Approach", 14 pages.

"Integrated Secruity Management", OpenPMF(Policy Managment Framework), 2 pages.

Mahon, "OpenView PolicyXpert: Heterogeneous Configuration and Control", OpenView Policy-Based Network Management, Feb. 1999, 4 pages.

"C.O.B.A.S Centralized Out-Of-Band Authentication System", QT Worldtel Inc., Sep. 8-9, 2003, pp. 14.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

Chen, et al., "Performance Prediction of Component-based Applications", available at least as early as Jan. 10, 2007, at <<http://www.ug.it.usyd.edu.au/~iango/papers/jss_paper_draft_0503.pdf>>, pp. 1-12

Office Action from the Patent Office of the State Intellectual Property Office of the People's Republic of China, Application No. 200410033027.7, mailed Feb. 2, 2007, 23 pages.

Chunxiao, et al, Using XML Schema to Configure Mobile E-Commerce Transaction Model, Applications of the Computer Systems, No. 2, Feb. 28, 2002, 9 pages.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx, Nov. 15, 2004.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distrubuted object System" ACM, Oct. 1998, pp. 374-400.

Menezes, et al., "Handbook of Applied Cryptography" CRC Press, 1996, Chapters 8 & 12, pp. 283-319 and 489-541.

Harbour, et al., "MAST An Open Environment for Modeling, Analysis and Design of Real-Time Systems", available at least as early as Jan. 10, 2007, at <<http://citeseer.ist.psu.edu/cache/papers/cs/30959/http:zSzzSzwww.ctr.unican.eszSzpublicationszSzmgh-jlm-jjg-jcp-jmd-2002a.pdf/mast-an-open-environment.pdf>>, pp. 1-16.

Hardwick, et al., "Modeling the Performance of E-Commerce Site", Jan. 6, 2007, at <<http://www.cs.cmu.edu/~jch/publications/hardwick01modeling.html>>, Journal of Computer Resource Management, 2002, pp. 1-11.

Howard et al., "Designing Secure Web-Based Applications for Microsoft Windows 2000", 2000.

Translated the Japanese Office Action mailed on Jan. 26, 2007 for Japanese Patent Application No. 2001-326848, a counterpart foreign application of US Patent No. 6,886,038.

Translated the Japanese Office Action for Japanese Patent Application No. 2004-061396, mailed on Jun. 24, 2008, 27 pages.

Translated the Japanese Office Action mailed on Dec. 14, 2007 for Japanese Patent Appliction No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkui-077.pdf.

Kounev, "A Capacity Planning Methodology for Distributed E-Commerce Applications", Jan. 2, 2001, pp. 1-13.

Lee, et al., "Community Services: A Toolkit for Rapid Deployment of Network Services", Proceedings of the IEEE International Conference on Cluster Computing, Cluster 2002, IEEE, 2002, 4 pages.

Levillain, et al., "Switch-Based Server Load Balancing for Enterprises," Alcatel Telecommunications Review; No. 4 pp. 298-302, 2002.

Liu et al., "Visualization in Network Topology Optimization", ACM, 1992, pp. 131-138.

Meader, P., "Build Distributed Apps a New Way." VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

Miyamoto, et al., "VLAN Management System on Large-scale Network," Journal of Information Processing Society of Japan, vol. 41, No. 12, pp. 3234-3244, the Information Processing Society of Japan, Dec. 15, 2000, (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

PCT Intl Search Report and Written Opinion for Applicaiton No. PCT/US2006/038856, dated Feb. 20, 2007, 9 pgs.

"Pretty Good Privacy PGP for Personal Privacy, Version 5.0 For Windows 95 Windows NT", Pretty Good Privacy Inc., 1997, pp. 137.

Selic, "A Generic Framework for Modeling Resources with UML", available at least as early as Jan. 10, 2007, at <<http://ieeexplore.ieee.org/iel5/2/18367/00846320.pdf?isNumber=>>, IEEE, Jun. 2000, pp. 64-69.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Frolund, et al., "Design-Time Simulation of a Large-Scale, Distrubuted object System" ACM 1998, pp. 374-400.

"System Definition Model," Windows Server System Home, http://www.microsoft.com/windowsserversystem/dsi/sdm.mspx, Dec. 15, 2003.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, Oct. 31, 2001, http://www.hpl.hp.com/techreports/2001/HPL-2001-276.pdf.

Vadim, "On Virtual Data Centers and Their Operating Environments", at <<http://www.hpl.hp.com/techreports/2001/HPL-2001-44.html>>, Mar. 8, 2001, pp. 1-20.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.

Yuhui, e-Commerce Based on ERP for Enterprize by Utilizing DNA and XML, Computer Engineering, vol. 27, No. 6, Jun. 2001, p. 165, 166, 182.

Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

Japanese Office Action for JP Application No. 2004-061396, mailed on Jul. 18, 2008, 27 pages.

* cited by examiner

*Primary Examiner*—Kevin Bates
(74) *Attorney, Agent, or Firm*—Lee & Hayes, PLLC

(57) ABSTRACT

In accordance with certain aspects of the model-based policy application, each of a plurality of policies is associated with appropriate parts of a model of a heterogeneous system. A deployment agent is invoked to apply each of the plurality of policies to components associated with the parts of the model. An identification of a change to one of the plurality of policies is received, and the deployment agent is also invoked to apply the changed policy to selected ones of the components associated with the parts of the model.

20 Claims, 5 Drawing Sheets

MODEL-BASED POLICY APPLICATION

RELATED APPLICATIONS

This application is a continuation of U.S. patent application Ser. No. 11/427,041 filed Jun. 30, 2006 entitled "Model-Based Policy Application" which is a continuation-in-part of U.S. patent application Ser. No. 11/170,700, filed Jun. 29, 2005, entitled "Model-Based System Management", which is a continuation-in-part of U.S. patent application Ser. No. 10/693,838, filed Oct. 24, 2003, entitled "Integrating Design, Deployment, and Management Phases for Systems", which are hereby incorporated by reference herein. U.S. patent application Ser. No. 10/693,838 claims the benefit of U.S. Provisional Application No. 60/452,736, filed Mar. 6, 2003, entitled "Architecture for Distributed Computing System and Automated Design, Deployment, and Management of Distributed Application", which is hereby incorporated herein by reference.

This application is related to the following applications, each of which is hereby incorporated by reference herein:

U.S. patent application Ser. No. 11/077,265, filed Mar. 10, 2005, entitled "Model-Based System Provisioning";

U.S. patent application Ser. No. 11/169,973, filed Jun. 29, 2005, entitled "Model-Based Virtual System Provisioning";

U.S. patent application Ser. No. 11/169,502, filed Jun. 29, 2005, entitled "Model-Based Provisioning of Test Environments";

U.S. patent application Ser. No. 11/170,092, filed Jun. 29, 2005, entitled "Model-Based Configuration Management";

U.S. patent application Ser. No. 11/107,419, filed Apr. 15, 2005, entitled "Model-Based System Monitoring";

U.S. patent application Ser. No. 11/107,418, filed Apr. 15, 2005, entitled "Model-Based Capacity Planning"; and U.S. patent application Ser. No. 11/170,715, filed Jun. 29, 2005, entitled "Model-Based Propagation of Attributes".

BACKGROUND

Computers have become increasingly commonplace in our world and offer a variety of different functionality. Some computers are designed primarily for individual use, while others are designed primarily to be accessed by multiple users and/or multiple other computers concurrently. These different functionalities are realized by the use of different hardware components as well as different software applications that are installed on the computers.

Although the variety of available computer functionality and software applications is a tremendous benefit to the end users of the computers, such a wide variety can be problematic for people (e.g., system administrators) that are tasked with keeping the computers running. System administrators are oftentimes responsible for applying particular policies to computers in a system, and these policies can differ for different computers. Different types of policies can be applied, such as policies regarding whether firewalls should be enabled, policies regarding data integrity (e.g., encryption, access control, backup, etc.), policies regarding user access, and so forth. Given the large number of computers that may be included in a system that a system administrator may be responsible for, and the dynamic nature of these systems due to computers being added and/or removed, ensuring that the desired policies are applied to the appropriate computers can be a very burdensome task. Thus, it would be beneficial to have a way to ease the burden of applying policies to computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Model-based policy application is described herein. In accordance with certain aspects of the model-based policy application, each of a plurality of policies is associated with appropriate parts of a model of a heterogeneous system. A deployment agent is invoked to apply each of the plurality of policies to components associated with the parts of the model. An identification of a change to one of the plurality of policies is received, and the deployment agent is also invoked to apply the changed policy to selected ones of the components associated with the parts of the model. Additionally, in certain aspects, an identification of a change to one of the parts of the model is received, and the deployment agent is also invoked to apply or remove the policy to or from selected ones of the components associated with the modified parts of the model.

BRIEF DESCRIPTION OF THE DRAWINGS

The same numbers are used throughout the drawings to reference like features.

DETAILED DESCRIPTION

Figure 1:
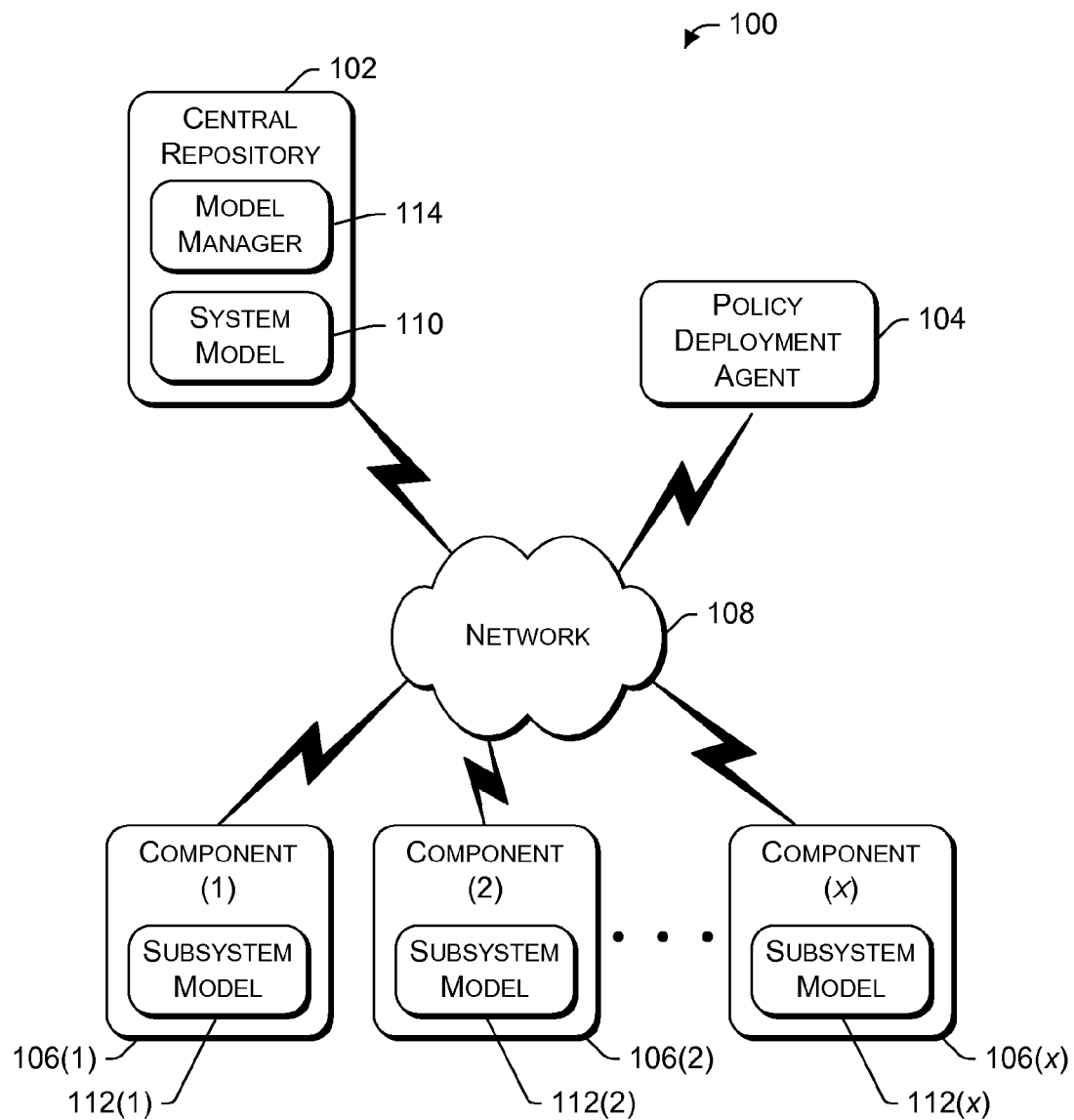
FIG. 1 illustrates an example system employing the model-based policy application described herein.

As used herein, an application refers to a collection of instructions that can be executed by a processor, such as a central processing unit (CPU) of a computing device. An application can be any of a variety of different types of software or firmware, or portions thereof. Examples of applications include programs that run on an operating system, the operating system, operating system components, services, infrastructure, middleware, portions of any of these, and so forth.

A system definition model (SDM) describes a system that can be managed. Management of a system can include, for example, maintaining policies for the system, deploying policies to components of the system, installing software on the system, monitoring the performance of the system, maintaining configuration information about the system, verifying that constraints within the system are satisfied, combinations thereof, and so forth. A system can be, for example, an application, a single computing device, multiple computing devices networked together (e.g., via a private or personal network such as a local area network (LAN) or via a larger network such as the Internet), and so forth.

The systems discussed herein can be virtual systems that include one or more virtual machines. A virtual machine can be thought of as a computing device implemented in software. A virtual machine emulates a computing device, including all of the hardware components of a computing device (except for possibly the processor(s)). A virtual machine runs on a computing device in its own isolated and self-contained environment, having its own operating system and optionally other software installed on it. Multiple virtual machines can be run on the same computing device, each of the multiple virtual machines having its own isolated environment and its own operating system installed thereon. A virtual system includes one or more computing devices that run a virtual machine. A virtual system can include one or more computing devices that already run a virtual machine and/or one or more computing devices that are to have a virtual machine provisioned thereon. A virtual machine can be provisioned on a computing device as part of the virtual system provisioning described herein.

In addition to conventional virtual machines, other forms of containers for workloads are being contemplated or implemented in the industry, such as "sandboxes" that allow a workload to run within an operating system that is shared with other workloads but which nonetheless provide the workloads more isolation than if the workloads were running directly in the operating system. These different containers can be viewed as "lightweight" virtual machines, in the sense that they provide many of the same benefits as traditional virtual machines with less cost or operational overhead. The techniques described herein can be used for such containers as well as traditional virtual systems, and references to virtual machines herein include such other forms of containers.

FIG. 1 illustrates an example system 100 employing the model-based policy application described herein. System 100 includes a central repository 102, a policy deployment agent 104, and multiple (x) components 106(1), 106(2), ..., 106(x), coupled together via a data communications network 108. Components 106 represent software and/or hardware components. System 100 can be a homogeneous system in which components 106 are all of same type of component (e.g., a desktop computer, a server computer, a particular software application, and so forth). Oftentimes, though, system 100 will be a heterogeneous system. A heterogeneous system refers to a system in which different types of components are included as components 106, and these different types of components can have different operating systems. For example, components 106 may include desktop computers, file server computers, email server computers, handheld computers, cellular telephones, and so forth. Components 106 may also include different services or applications, such as email software applications, backup software applications, Microsoft Active directory® directory services, domain name system (DNS) directory services, dynamic host configuration protocol (DHCP) network protocols, distributed file systems, and so forth. Because of the different types of components that can be included as part of the same system, the system is referred to as a heterogeneous system.

Data communications network 108 allows communication among components 106, agent 104, and repository 102. Data communications network 108 can be a wired or wireless network, such as a local area network (LAN), wide area network (WAN), and so forth. Data communications network 108 can also be partially or entirely internal to a computer, such as one or more buses in a computer. Data communications network 108 can also represent various communications channels used by software applications to communicate with one another, such as messages, notifications, and so forth.

System model 110 is a system definition model (SDM) of system 100. System model 110 is intended to describe all of system 100, although in some situations parts of system 100 may not be described by system model 110. Portions of system model 110 that represent a portion of system 100 (a subsystem) may also be stored as subsystem models 112(1), 112(2), ..., 112(x) at the individual components 106. Each of these subsystem models 112 replicates a portion of system model 110, and typically replicates a different portion of system model 110. For example, the subsystem model 112 for a particular component 106 may typically include the part of system model 110 that describes that particular component 106 (e.g., all the hardware and software for a particular computer), as well as other services in system 100 that are often used by that particular component 106 (e.g., server computers, network printers, and so forth).

In certain embodiments, central repository 102 maintains a record of which portions of system model 110 have been replicated on which components 106. Whenever a change is made to part of system model 110, model manager 114 forwards an identification of the changes to those components 106 that have a subsystem model 112 that is affected by the change. Additionally, if any changes are made locally at a component 106, then the component 106 forwards an indication of those changes to model manager 114 so that system model 110 can be updated.

Alternatively, no portions of system model 110 may be replicated, in which case subsystem models 112 would be included in system 100. In other alternatives, there may be no central repository 102 and system model 110, rather the system model may be maintained by the components 106 themselves (each may maintain the system model in its entirety, or alternatively only a portion of the system model).

System model 110 includes policy information for system 100. A policy refers to an expression of a desired state or behavior of a system (all of system 100, or alternatively a portion of system 100). Policy deployment agent 104 is invoked by model manager 114 when a new policy is to be deployed, when a policy is changed, and when a change is made to system model 110. Although shown separately in FIG. 1, policy deployment agent 104 may alternatively be part of central repository 102, or alternatively may be part of one or more of components 106. As discussed in more detail below, model manager 114 targets policies to particular components 106 using system model 110. Model manager 114 uses system model 110 to identify which components 106 are affected by a new policy, a change in policy, or which policies apply to a newly added component 106. Policy deployment agent 104 is then notified of the identified components so that the policy can be deployed to the identified components. Although model manager 114 is illustrated as part of central repository 102, model manager 114 may alternatively be implemented separately from central repository 102.

Any of a variety of different policies can be included in system model 110. In certain embodiments all policies that apply to system 100 are included in system model 110. Alternatively, one or more policies that apply to system 100 may be included in system model 110, while one or more other policies that apply to system 100 may be applied to system 100 in other manners.

One type of policy that may be included in system model 110 is a software deployment policy. A software deployment policy describes, for each software system to be deployed, the targeting rules which determine on which machine or group of machines the software is to be deployed, and so forth. Targeting may be based on administrative data which might be stored in a directory (such as membership in a department), on technical data (such as operating system, size and performance of the machine and available network bandwidth for the connection to the machine), on geographic location, on the existence of other software on the machine, on manually designated membership in a group based on external criteria, combinations of these, and so forth. The policy may also include a schedule for when the installation should be done, such as a specific time and date, an offering period with a deadline, or a set of change windows when configuration changes are allowed. The policy may also include a schedule for transporting the software over a network, and a separate schedule for installing or activating the software. The policy may specify whether the installation is required or should merely be offered to the user. The policy may specify whether the software is to be available to all users of a computer, or only some specified users. The policy may specify the resources required to complete the installation, both files and access to external services such as the Microsoft Active directory® directory service, databases or web services. The policy may specify the credentials to be used for the installation or required for access to external services. The policy may include specifications for how to report the result of the installation (success, failure, other data).

Another type of policy that may be included in system model 110 is a configuration management policy. A configuration management policy describes what software must be, may be, and/or must not be on a machine; the proper settings for software, operating system, firmware or hardware; what action to take if a machine is found to be in violation of policy (such as report the violation, send an alert to a system administrator, correct the situation, enforce the policy by preventing the violation from happening in the first place, and so forth), and so forth. The specification of proper settings may be a single value (e.g., "the firewall must be on"), ranges or lists of acceptable values (e.g., "the buffer size must be between 100 and 200"), or complex criteria (e.g., "the authentication method for each of the components must be either SSL (Secure Sockets Layer) or TLS (Transport Layer Security), but all of the components must have the same setting"). A configuration management policy may also include targeting, scheduling and reporting specifications of the same type as for software deployment. Scheduling can include start and expiration times, change windows or applicability windows (e.g., "during working hours configuration 1 is in effect, at night and on weekends configuration 2 is in effect").

Another type of policy that may be included in system model 110 is a data protection policy. A data protection policy indicates how often data should be backed up, how it should be backed up (e.g., complete backup, incremental backup, etc.), where it should be backed up to (e.g., disk, tape, etc.), what data should be backed up (e.g., a specific directory or volume, certain types of files, date ranges, etc.), and so forth. A data protection policy might also include propagation or retention rules, when old data is to be moved from online to offline storage, or is to be discarded altogether. A data protection policy might also specify encryption or other security characteristics.

Another type of policy that may be included in system model 110 is an inventory policy. An inventory policy indicates what data should be collected, how often it should be collected, where it should be sent, and so forth. Inventory to be collected may include the existence and configuration of specified software, heuristics for identifying all software on the machine, a wide range of files and settings to allow detection of software through analysis after the fact, hardware configuration, serial numbers, connections to networks and storage systems, configuration of services or virtual machines, and so forth.

Another type of policy that may be included in system model 110 is a health monitoring policy. A health monitoring policy includes a health model, which describes the components of the system under management and their relationships, aspects of each component that should be monitored, a state machine for each aspect which describes the health states and state transition indicators such as events and thresholds of metrics (together with polling intervals for those metrics), diagnostic or corrective actions to take on entry to health states, the algorithm for rolling up health state in a hierarchy or to propagate it along other relationships, how to identify the root cause of a problem, reporting or alerting actions, and so forth. The policy may be self-adjusting, so thresholds, polling intervals and propagation rules are adjusted in response to certain events or states. For distributed services, with components and behavior being monitored on several computers, all the elements described above may be distributed, the relationships may cross machines, and hence the algorithms and processes that interpret and execute the policy are distributed. In some cases, relationships and processes may cross trust boundaries (e.g., when monitoring a distributed service that includes processing on customers', suppliers' or partners' systems). Health monitoring policies can also include targeting and scheduling rules as discussed above.

Another type of policy that may be included in system model 110 is a workload deployment policy. Workload deployment for purposes of disaster recovery, on-demand scale-out or batch job execution operates under a policy that describes the needs of a workload, and the rules that compares these needs with the available capabilities and capacities of candidate host machines (e.g., based on already deployed or scheduled workloads), the indications that should trigger such a workload placement (e.g., an unsatisfactory service level metric, a failure indication by a health monitoring system, a request for work by a workflow system, or a schedule), the prioritization method for choosing among available hosts (e.g., load balancing, pack machines as full as possible before moving on), and so forth.

Another type of policy that may be included in system model 110 is a task execution policy. Execution of tasks is often controlled by policy, which may indicate what tasks or jobs should be executed, where they should be executed (targeting), when they should be executed (scheduling), and what resources are required (e.g., files, data, access to network bandwidth, storage area networks, databases or other services), and so forth. Targeting, scheduling and resources have the same characteristics as in the cases discussed above. The definition of the task sequence or job may be a part of the policy to assist in exposing progress management, error handling and results management to the policy execution system. For example, the policy states whether the task is idempotent (can be restarted in case of failure), or if it has specific checkpoints from which it can be restarted, or if complex compensating actions are needed before it can be restarted; if the machine fails and the job needs to be transferred to another machine, in addition to the restart logic, the policy describes what resources are to be transferred. Note that task policies include both single tasks and regularly scheduled tasks: e.g., "do this there now" is a valid policy.

Figure 2:
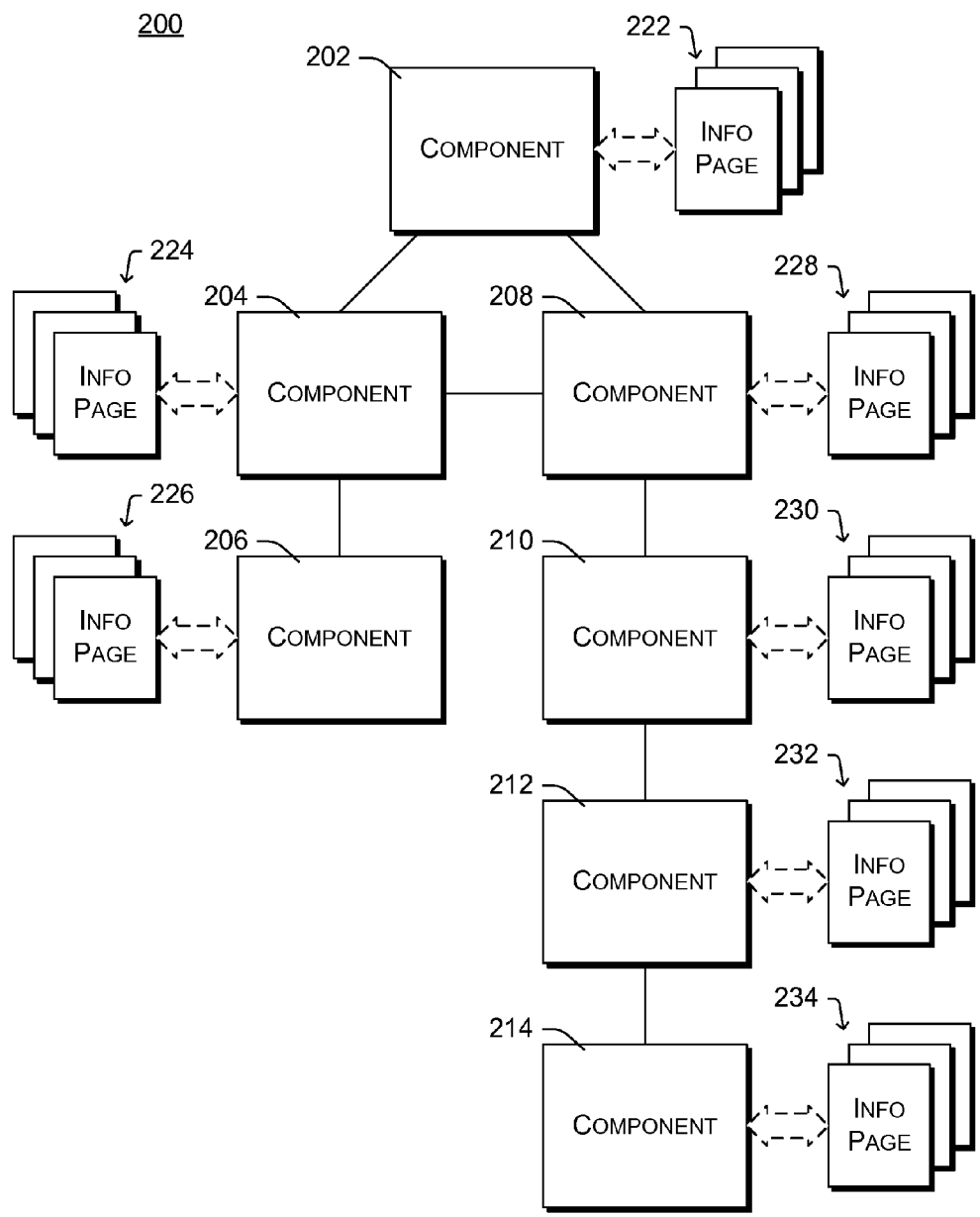
FIG. 2 illustrates an example system definition model (SDM) that can be used with the model-based policy application described herein.

FIG. 2 illustrates an example SDM 200 that can be used with the model-based policy application described herein. SDM 200 is an example of system model 110 of FIG. 1. SDM 200 includes a component corresponding to each of one or more software and/or hardware components being managed in a system (e.g., system 100 of FIG. 1). These software and/or hardware components being managed refer to those software and/or hardware components that the author of SDM 200 and/or designers of the system desires to include in SDM 200. Examples of hardware and/or software components that could be in a system include an application (such as a database application, email application, file server application, game, productivity application, operating system, and so forth), particular hardware on a computer (such as a network card, a hard disk drive, one of multiple processors, and so forth), a virtual machine, a computer, a group of multiple computers, and so on. A system refers to a collection of one or more hardware and/or software components.

SDM 200 represents a system including component 202, component 204, component 206, component 208, component 210, component 212, and component 214. Although the example SDM 200 includes seven components, in practice a system, and thus the SDM, can include any number of components.

For example, component 206 could represent a particular computer, while component 204 represents an operating system running on that particular computer. By way of another example, component 206 could represent an operating system, while component 204 represents a database application running on the operating system. By way of yet another example, component 214 could represent a particular computer, while component 212 represents an operating system installed on that particular computer, component 210 represents a virtual machine running on the operating system, and component 208 represents an operating system running on the virtual machine. Note that the operating systems associated with component 212 and component 208 could be the same or alternatively two different operating systems.

The SDM is intended to be a comprehensive knowledge store, containing all information used in managing the system. This information includes information regarding the particular components in the system, as well as relationships among the various components in the system. Despite this intent, it is to be appreciated that the SDM may contain only some of the information used in managing the system rather than all of the information.

Relationships can exist between different components in a system, and these relationships are typically illustrated in SDM diagrams with lines connecting the related components. Examples of relationships that can exist between components include containment relationships, hosting relationships, and communication relationships. Containment relationships identify one component as being contained by another component—data and definitions of the component being contained are incorporated into the containing component. When a component is installed on a system, any components contained in that component are also typically installed on the system. In FIG. 2, containment relationships are illustrated by the diagonal lines connecting component 202 and component 204, and connecting component 202 and component 208.

Hosting relationships identify dependencies among components. In a hosting relationship, the hosting component typically must be present in order for the guest component to be included in the system. In FIG. 2, hosting relationships are illustrated by the vertical lines connecting component 204 and component 206, connecting component 208 and component 210, connecting component 210 and 212, and connecting component 212 and 214.

Communication relationships identify components that can communicate with one another. Communication relationships may or may not imply that a dependency exists between the components. In FIG. 2, communication relationships are illustrated by the horizontal line connecting component 204 and component 208.

Associated with each component in SDM 200 (and thus also associated with a hardware and/or software component in a system) is one or more information (info) pages. Information pages 222 are associated with component 202, information pages 224 are associated with component 204, information pages 226 are associated with component 206, information pages 228 are associated with component 208, information pages 230 are associated with component 210, information pages 232 are associated with component 212, and information pages 234 are associated with component 214. Each information page contains information about the associated component. Different types of information can be maintained for different components. One or more information pages can be associated with each component in SDM 200, and the particular information that is included in a particular information page can vary in different implementations. All the information can be included on a single information page, or alternatively different pieces of information can be grouped together in any desired manner and included on different pages. In certain embodiments, different pages contain different types of information, such as one page containing installation information and another page containing policy information. Alternatively, different types of information may be included on the same page, such as installation information and policy information being included on the same page.

Examples of types of information pages include policy pages, installation pages, constraint pages, monitoring pages, service level agreement pages, description pages, and so forth. Policy pages include information describing a policy. A policy, as discussed above, refers to an expression of a desired state or behavior of a system. Examples of policies are discussed above.

Installation pages include information describing how to install the associated component onto another component (e.g., install an application onto a computer), such as what files to copy onto a hard drive, what system settings need to be added or changed (such as data to include in an operating system registry), what configuration programs to run after files are copied onto the hard drive, sequencing specifications that identify that a particular installation or configuration step of one component should be completed before an installation or configuration step of another component, and so forth.

Constraint pages include information describing constraints for the associated component, including constraints to be imposed on the associated component, as well as constraints to be imposed on the system in which the associated component is being used (or is to be used). Constraints imposed on the associated component are settings that the component should have (or alternatively should not have) when the component is installed into a system. Constraints imposed on the system are settings (or other configuration items, such as the existence of another application or a piece of hardware) that the system should have (or alternatively should not have) in order for the associated component to be used in that particular system.

It should also be noted that constraints can flow across relationships. For example, constraints can identify settings that any component that is contained by the component, or that any component that contains the component, should have (or alternatively should not have). By way of another example, constraints can identify settings that any component that is hosted by the component, or that any component that hosts the component, should have (or alternatively should not have). By way of yet another example, constraints can identify settings that any component that communicates with the component should have (or alternatively should not have).

In addition, constraint pages may also include a description of how particular settings (or components) are to be discovered. For example, if a constraint indicates that an application should not co-exist with Microsoft® SQL Server, then the constraint page could also include a description of how to discover whether Microsoft® SQL Server is installed in the system. By way of another example, if a constraint indicates that available physical memory should exceed a certain threshold, then the constraint page could also include a description of how to discover the amount of available physical memory in the system. By way of still another example, if a constraint indicates that a security setting for Microsoft® SQL Server should have a particular value, then the constraint page could also include a description of how to discover the value of that security setting for Microsoft® SQL Server.

Constraint pages may also include a description of how particular settings are to be modified if they are discovered to not be in compliance with the constraints. Alternatively, the constraint pages could include specifications of some other action(s) to take if particular settings are discovered to not be in compliance with the constraints, such as sending an event into the system's event log, alerting an operator, starting a software application to take some corrective action, and so forth. Alternatively, the constraint pages could include a policy that describes what action to take under various circumstances, such as depending on the time of day, depending on the location of the system.

Constraint pages may also optionally include default values for at least some of these settings, identifying a default value to use within a range of values that satisfy the constraint. These default values can be used to assist in installation of an application, as discussed in more detail below.

Monitoring pages include information related to monitoring the performance and/or health of the associated component. This information can include rules describing how the associated component is to be monitored (e.g., what events or other criteria to look for when monitoring the component), as well as what actions to take when a particular rule is satisfied (e.g., record certain settings or what events occurred, sound an alarm, etc.).

Service level agreement pages include information describing agreements between two or more parties regarding the associated component (e.g., between the purchaser of the associated component and the seller from which the associated component was purchased). These can be accessed during operation of the system to determine, for example, whether the agreement reached between the two or more parties is being met by the parties.

Description pages include information describing the associated component, such as various settings for the component, or other characteristics of the component. These settings or characteristics can include a name or other identifier of the component, the manufacturer of the component, when the component was installed or manufactured, performance characteristics of the component, and so forth. For example, a description page associated with a component that represents a computing device may include information about the amount of memory installed in the computing device, a description page associated with a component that represents a processor may include information about the speed of the processor, a description page associated with a component that represents a hard drive may include information about the storage capacity of the hard drive and the speed of the hard drive, and so forth.

As can be seen in FIG. 2, an SDM maintains various information (e.g., policy, installation, constraints, monitoring, etc.) regarding each component in the system. Despite the varied nature of these information pages, they are maintained together in the SDM and thus can all be readily accessed by various utilities or other applications involved in the management of the system.

An SDM can be generated and stored in any of a variety of different ways and using any of a variety of different data structures. For example, the SDM may be stored in a database. By way of another example, the SDM may be stored in a file or set of multiple files, the files being encoded in XML (Extensible Markup Language) or alternatively some other form. By way of yet another example, the SDM may not be explicitly stored, but constructed each time it is needed. The SDM could be constructed as needed from information existing in other forms, such as installation specifications.

In certain embodiments, the SDM is based on a data structure format including types, instances, and optionally configurations. Each component in the SDM corresponds to or is associated with a type, an instance, and possibly one or more configurations. Additionally, each type, instance, and configuration corresponding to a particular component can have its own information page(s). A type refers to a general template having corresponding information pages that describe the component generally. Typically, each different version of a component will correspond to its own type (e.g., version 1.0 of a software component would correspond to one type, while version 1.1 of that software component would correspond to another type). A configuration refers to a more specific template that can include more specific information for a particular class of the type. An instance refers to a specific occurrence of a type or configuration, and corresponds to an actual physical component (software, hardware, firmware, etc.).

For types, configurations, and instances associated with a component, information contained in information pages associated with an instance can be more specific or restrictive than, but generally cannot contradict or be broader than, the information contained in information pages associated with the type or the configuration. Similarly, information contained in information pages associated with a configuration can be more specific or restrictive than, but cannot contradict or be broader than, the information contained in information pages associated with the type. For example, if a constraint page associated with a type defines a range of values for a buffer size, the constraint page associated with the configuration or the instance could define a smaller range of values within that range of values, but could not define a range that exceeds that range of values.

It should be noted, however, that in certain circumstances a model of an existing system as deployed (that is, a particular instance of a system) may violate the information contained in information pages associated with the type for that existing system. This situation can arise, for example, where the system was deployed prior to an SDM for the system being created, or where a user (such as a system administrator) may have intentionally deployed the system in noncompliance with the information contained in information pages associated with the type for that existing system, or where a user (such as a system administrator) may have temporarily modified the system for purposes of meeting short-term requirements or for diagnosing or curing a fault.

It should also be noted that, in addition to model-based policy application, SDM 200 can be used to manage many other aspects of the system. For example, the same SDM 200 that is used for model-based policy application can also be used to provision systems, to provision virtual systems, to provision test environments, to monitor the health of the system, to manage configurations of the system, to update the model by propagating attributes, and so forth. Provisioning systems refers to installing applications in the system. Provisioning virtual systems refers to installing workloads on virtual machines in the system. Provisioning test environments refers to installing applications in the test environments, and can also include installing test environments in the system.

Predicting system capacity refers to simulating the operation of various transactions on a planned system without having to actually create or test the planned system. Monitoring the health of the system refers to maintaining information about the operating status or health of the components in the system. Managing configurations of the system refers to managing the desired configuration of a system and allowing for notification when a configuration setting violates the desired configuration. Updating the model by propagating attributes refers to defining one or more attributes associated with the system or associated with particular components in the system, and flowing those attributes over relationships to other components in the system.

Figure 3:
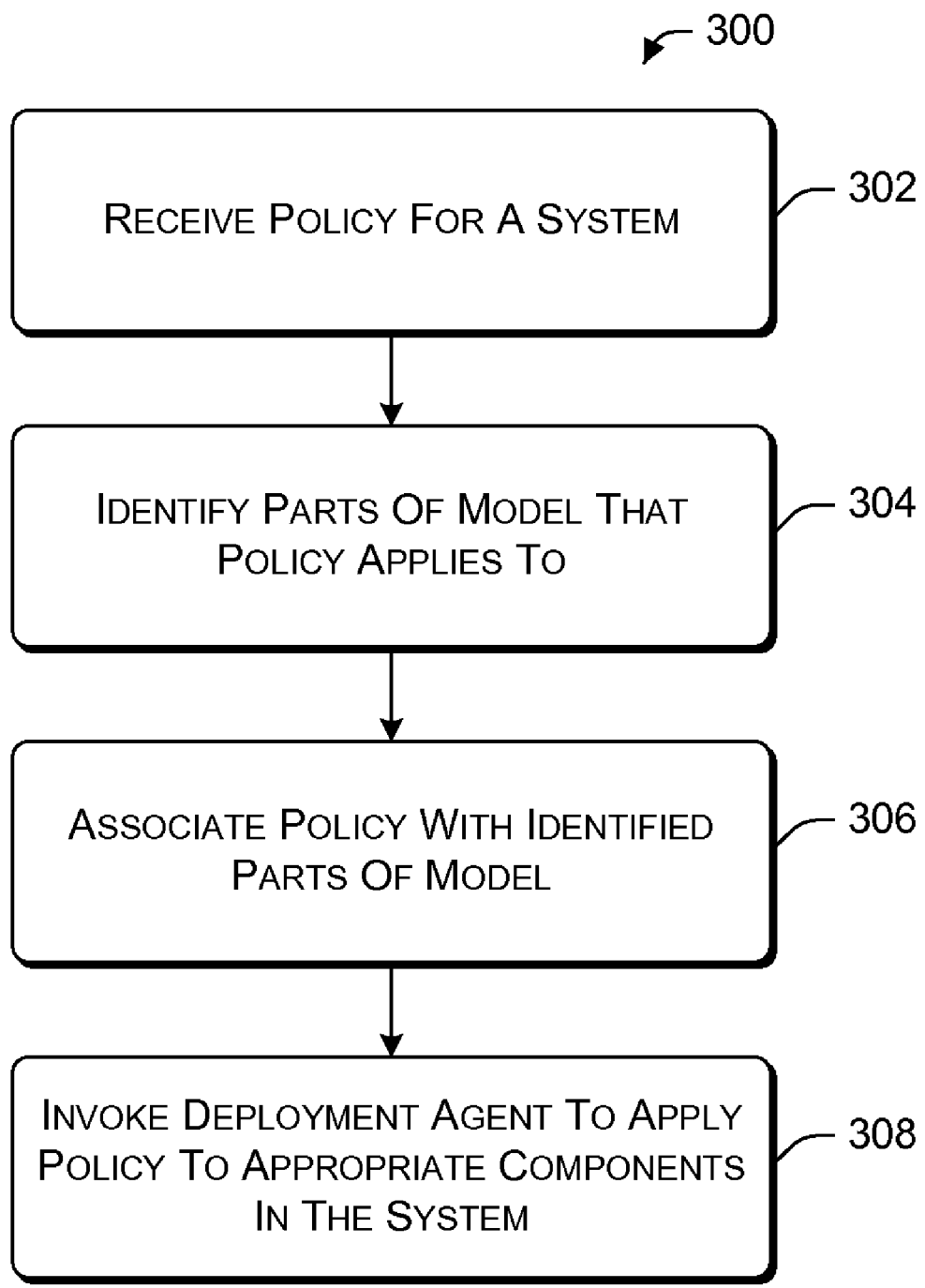
FIG. 3 is a flowchart illustrating an example process for applying policies to components in a system.

FIG. 3 is a flowchart illustrating an example process 300 for applying policies to components in a system. Process 300 can be carried out, for example, by model manager 114 of FIG. 1, and may be implemented in software, firmware, hardware, or combinations thereof. FIG. 3 is discussed with reference to the elements of FIG. 1.

When a new policy is to be applied to or deployed on components in system 100, the new policy is received by model manager 114 (act 302). The new policy may apply to all of system 100, or more typically only a part of system 100 (which can be viewed as a subsystem of system 100). The system or subsystem to which the new policy applies can be a homogeneous system or subsystem, but oftentimes is a heterogeneous system or subsystem. For example, a new policy may be received that is to apply to all components in a payroll processing system of a corporation. All of the hardware and all of the software applications of the corporation would be included as part of system 100, but only that hardware and those software applications that are used in payroll processing would be part of the payroll processing system (e.g., particular file servers, particular desktop computers, particular email addresses, particular backup storage devices, and so forth), and that hardware and those software applications would comprise the heterogeneous subsystem to which the new policy is to apply.

Model manager 114 identifies the parts of the system model that the received policy applies to (act 304). This identification can be performed in different manners. Model manager 114 receives, as part of the new policy or separately, an identification of the subsystem to which the new policy applies (e.g., the payroll processing system, the legal department, the human resources department, and so forth). It is to be appreciated that the different subsystems that may be included within the system model can vary. The system model includes information that identifies which particular components are part of which subsystem(s). This information can be reflected, for example, in the information pages associated with the components. For example, the description information pages associated with the components in the system model may identify which subsystem(s) those components are part of. Additionally, the relationships in the model can be used to identify which components are part of which subsystems. For example, if a particular component is known to be part of a subsystem (e.g., because of the information in its associated description information page), then all components contained by that particular component (as indicated by a containment relationship(s) in the model) are also part of the subsystem.

A policy may also include rules that indicate how the policy should flow across different relationships. For example, a rule may indicate whether a policy that applies to a particular component should flow across to (in other words, be applied to) other components that have a communication relationship with that particular component. By way of another example, a rule may indicate whether a policy that applies to a particular component should flow across to (in other words, be applied to) other components that have a hosting relationship with that particular component.

Model manager 114 associates the new policy with the parts of the model to which the policy applies, as identified in act 304 (act 306). In certain embodiments, this association is performed by creating, for each component to which the policy applies, a policy information page that is associated with the component. Alternatively, if a policy information page is already associated with a particular component, then the association can be performed by adding the information for the new policy to the already existing policy information page.

Deployment agent 104 is then invoked by model manager 114 to apply the policy to the appropriate components in the system (act 308). As part of invoking deployment agent 104, model manager 114 identifies the policy, as well as the components that the policy applies to, to deployment agent 104. Deployment agent 104 then applies the policy to each of the hardware and/or software components in the system to which the policy applies. The exact manner in which the policy is applied to the various components can vary, depending on the nature of the policy, the nature of the components, and the design of deployment agent 104.

It should be noted that process 300 can also be used when a change to the system occurs. For example, addition of a component to the system results in the situation where received policies may need to be applied to the added component. The policies received in act 302 are identified and a determination is made as to which of those policies apply to the added component (as discussed in act 304). The appropriate policies are associated with the component in the model (as discussed in act 306), and the deployment agent is invoked to apply those policies to the added component (as discussed in act 308). Additionally, when a relationship between components in the model is added, removed or modified, process 300 is carried out.

In the case of removal of a component from the system, process 300 typically need not be employed. Rather, the removed component and its associated policy information page can simply be removed from the system model. However, in certain circumstances removal of a component causes the way policy applies to various components to be re-evaluated according to process 300. For example, if component 204 is removed, its hosting component 206 is no longer contained within system 202 and therefore policies that are applied to system 202, and therefore flowed across to components 204, 206, 208, 210 etc. should no longer apply to component 206.

In the case of modifying the type or characteristics of a component of the system, process 300 may be employed. In some cases, a component in the model represents an aggregate of several identical or similar components in the managed system, a configuration often termed "scale-out," and in such models the count of scale-out components is an attribute of the aggregate component, and when the count of scale-out components is altered process 300 generally is carried out.

Thus, it can be seen that the designer of a policy need not specifically identify which components in a system the policy is applied to.

Furthermore, when applying a new policy to a system, the system administrator need not remember nor try to identify which specific components the policy should be applied to.

Rather, the identification of the specific components can be performed automatically based on the system model.

Figure 4:
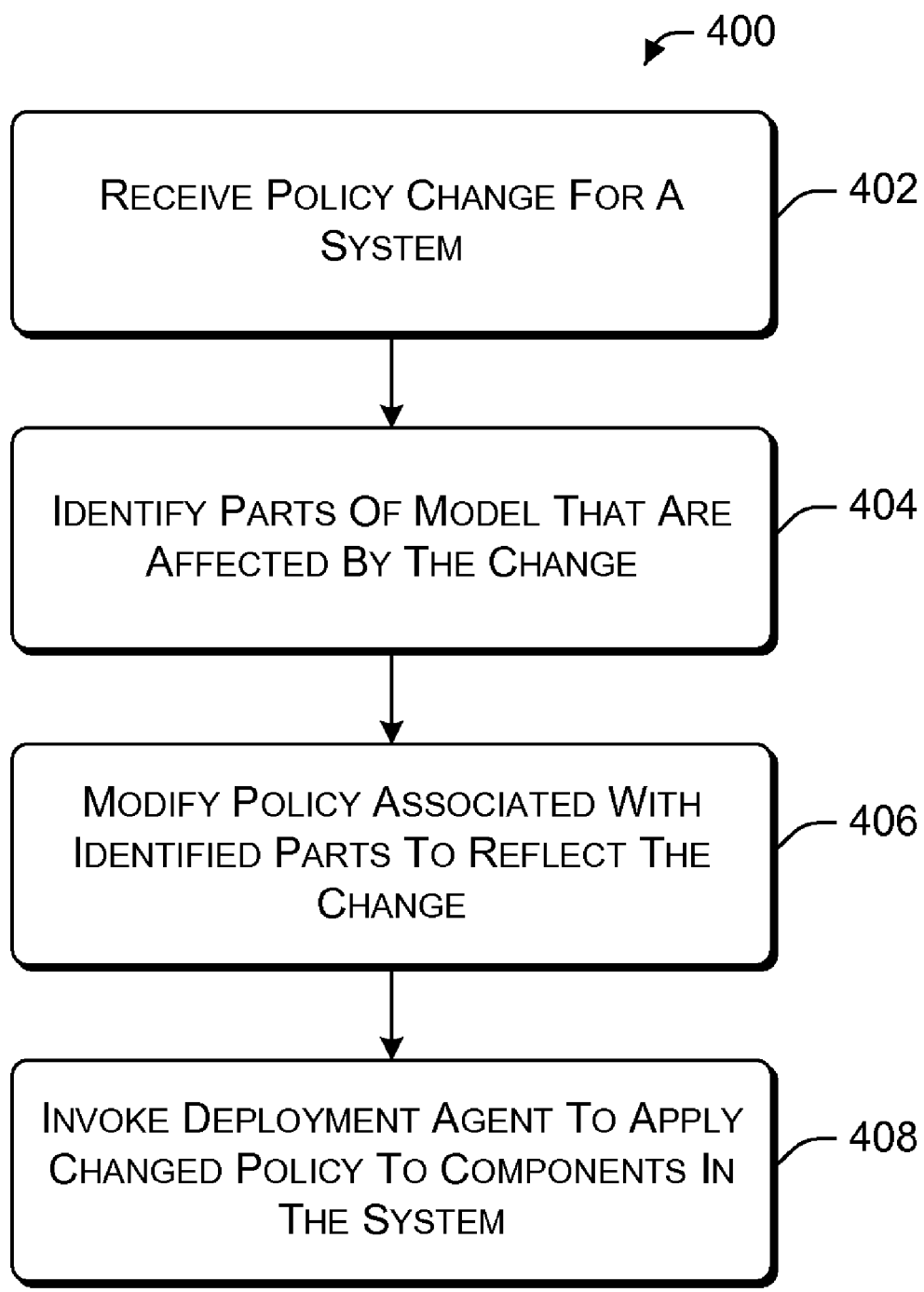
FIG. 4 is a flowchart illustrating an example process for updating a policy in a system.

FIG. 4 is a flowchart illustrating an example process 400 for updating a policy in a system. Process 400 can be carried out, for example, by model manager 114 of FIG. 1, and may be implemented in software, firmware, hardware, or combinations thereof. FIG. 4 is discussed with reference to the elements of FIG. 1.

When a policy is to be updated in system 100, the policy change is received by model manager 114 (act 402). The policy change may be in form of an entirely new policy that is to replace a previous policy, or alternatively an indication of additions to and/or deletions from a previous policy. Similar to the new policies discussed above with respect to FIG. 3, the policy changes may apply to all of system 100, or more typically only a part of system 100 (which can be viewed as a subsystem of system 100). The system or subsystem to which the policy change applies can be a homogeneous system or subsystem, but oftentimes is a heterogeneous system or subsystem.

Model manager 114 identifies the parts of the system model that are affected by the policy change (act 404). This identification can be performed in different manners. Model manager 114 may receive, as part of the new policy or separately, an identification of the subsystem to which the policy change applies (e.g., the payroll processing system, the legal department, the human resources department, and so forth). Similar to the discussion above regarding new policies, this subsystem identification can be used to identify the parts of the system model to which the policy change applies.

Alternatively, each policy may have a unique identifier. This unique identifier can be maintained in the system model, such as in the policy information pages associated with the components. Model manager 114 may receive, as part of the policy change or separately, an identification of the particular policy that is being changed. This identification can then be used to locate those policy information pages that include the same identification.

Model manager 114 modifies the policy associated with the parts of the model that are affected by the policy change (act 406). In certain embodiments, this modification is performed by adding, deleting, and/or replacing the changed policy information included in the policy information pages associated with the components in the system model. Alternatively, the previous policy information page may be replaced with a new policy information page that includes the changed policy information.

Deployment agent 104 is then invoked by model manager 114 to apply the changed policy to the appropriate components in the system (act 408). As part of invoking deployment agent 104, model manager 114 identifies the policy change, as well as the components that the policy change applies to, to deployment agent 104. Deployment agent 104 then applies the policy to each of the hardware and/or software components in the system to which the policy change applies. The exact manner in which the policy is applied to the various components can vary, depending on the nature of the policy, the nature of the components, and the design of deployment agent 104.

Alternatively, a policy change may be applied in a manner analogous to that of applying a new policy. When a policy change is received, model manager 114 can treat it as a new policy that is to completely replace the previous policy for the subsystem. Model manager 114 deletes any policy information pages previously associated with the subsystem, and then proceeds with acts 304, 306, and 308 of FIG. 3 to apply the new policy.

Thus, it can be seen that when the designer of a policy desires to change the policy, the designer need not specifically identify which components in a system the policy is applied to. Furthermore, when applying a policy change to a system, the system administrator need not remember nor try to identify which specific components the policy change should be applied to. Rather, the identification of the specific components can be performed automatically based on the system model.

Additionally, the model-based policy application discussed herein can be used to identify conflicts between different policies. For example, a policy associated with one component may indicate that a firewall must be enabled, while another policy associated with that same component may indicate that a firewall must be disabled. Such policy conflicts can be identified in different manners. In certain embodiments, whenever a new policy is associated with a component, it is added as a new policy information page. Any component having multiple associated policy information pages is viewed as being a candidate for having a policy conflict, and the policy information pages of these candidates can be analyzed by a conflict resolution agent in order to combine the policies into a single policy information page. The conflict resolution agent may automatically combine potentially conflicting policies in a manner which satisfies all the policies, or alternatively may flag certain conflicts for human resolution (e.g., in the situation where one policy says the firewall must be enabled and another says the firewall must be disabled).

Furthermore, the model-based policy application discussed herein can be used for impact analysis. Impact analysis refers to applying the policy to the system model, but not to the physical components in the system in order to identify any conflicts or other issues that may appear as a result of applying the policy. Performing impact analysis or simulation is well known to those skilled in the art, and thus will not be discussed further herein.

The model-based policy application discussed herein can also be used to assist in auditing. A record of which policies have been applied to which components can be maintained, such as by model manager 114 or policy deployment agent 104 of FIG. 1. This record can then be used for audits to verify that a particular policy or policies are applied to the system, and which components of the system the policy or policies are applied to.

It should be noted that policies can be represented in any of a variety of different formats. Additionally, different policies can be represented in different formats. Policy deployment agent 104 interprets these different formats and applies them to the appropriate components. The policies may also be compiled or compressed into a more compact form, or into a more easily executable form. For example, a security policy may be compiled into one or more access control lists (ACLs) that identify which users or systems are permitted to access particular resources.

It should also be noted that a policy can include expressions that refer to other components in the system model and that changes itself based on those other components. For example, a policy associated with a component that is a computer may be self-adapting based on the number of disk drives that are part of the computer (e.g., if the computer has only one disk drive then the data on the disk drive is to be backed up to a different computer, but if the computer has multiple disk drives then the data on the disk drives is to be backed up to the other disk drives of the computer).

Figure 5:
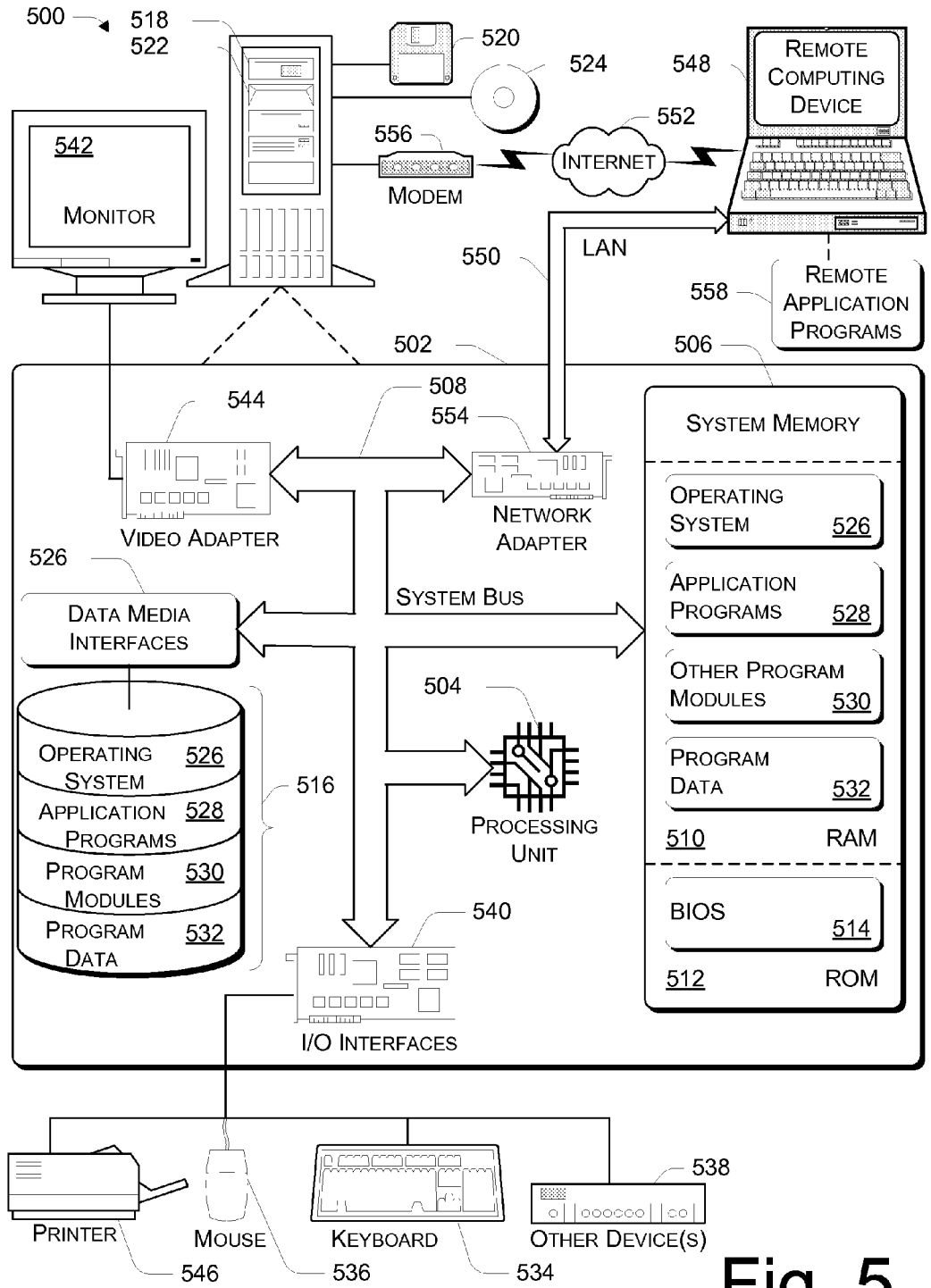
FIG. 5 illustrates an example general computer environment which can be used to implement the techniques described herein.

FIG. 5 illustrates an example general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. Computer 502 can be, for example, a component 106 of FIG. 1, or a computing device on which at least portions of process 300 of FIG. 3 and/or process 400 of FIG. 4 are implemented. Computer 502 can be, for example, a desktop computer, a handheld computer, a notebook or laptop computer, a server computer, a game console, and so on. Computer 502 can include, for example, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer storage media having stored thereon a plurality of instructions that, when executed by one or more processors, causes the one or more processors to perform a method, the method comprising:

associating a type, an instance, and one or more configurations with components of a system, each type, instance, and configuration having its own information page corresponding to a particular component, wherein:
  the type is a general template having corresponding information page that describes the type to which the particular component corresponds;
  the configuration is a specific template including specific information for a particular class of the type;
  the instance is a specific occurrence of the type or the configuration and corresponding to the particular component;
  information contained in information page associated with the instance is more specific or restrictive than the information contained in information pages associated with the configuration, unless instructed otherwise by a user; and
  information contained in information page associated with the configuration is more specific or restrictive than the information contained in information pages associated with the type, unless instructed otherwise by the user;
associating one or more information pages with components of the system to define a model of the system, wherein:
each component comprises at least one of:
an application,
  a particular hardware on a computer,
  a virtual machine,
  a computer, or
  a group of multiple computers;
each information page represents a specification for an associated component, each information page comprising at least two of following distinct pages:
  a policy page,
  an installation page,
  a constraint page,
  a monitoring page
  a service level agreement page, or
  a description page,
the model defines one or more relationships among the components, the relationships including:
  a containment relationship;
  a hosting relationship; or
  a communication relationship; and
the model supports deployment of a plurality of policies, wherein each policy applies to a subset of the system such that a system component affected by a first policy is not affected by a second policy;
associating two or more policies with particular components based on the information in a policy page associated with the particular components, the two or more policies comprising:
  a software deployment policy;
  a software configuration management policy;
  a data protection policy;
  an inventory data policy;
  a health monitoring policy;
  a workload deployment policy; or
  a task execution policy;
making the model accessible to various utilities or other applications involved in managing the system;
receiving an identification of a change to one of the policies; identifying appropriate components of the model to which the changed policy applies;
associating the changed policy with the identified appropriate components of the model; and
invoking a deployment agent to apply the changed policy to the identified appropriate components of the system associated with the parts of the model.

2. One or more computer storage media as recited in claim 1, the method further comprising:
receiving an identification of a change to the system, the change to the system being at least one of:
  addition of a component to the system,
  removal of a component from the system,
  change of a type of a component of the system, or
  addition, removal, or modification of a relationship among the components of the system;
associating appropriate policies with the components affected by the change to the system; and applying appropriate policies to the affected components in the system.

3. One or more computer storage media as recited in claim 1, wherein associating one or more policies with particular components based on the information in a policy page associated with the particular components comprises:
  receiving a policy for particular components of the system;
  identifying appropriate components of the system to which the policy applies; and
  associating the policy with the identified appropriate components.

4. One or more computer storage media as recited in claim 3, wherein identifying appropriate components of the system comprises accessing information pages associated with the components of the system and identifying, from the information in the information pages, the components of the system to which the policy applies.

5. A method comprising:
  establishing, by a computing device configured to provide model-based policy functionality, a plurality parts of a model of a system,
    the establishing including associating, by the computing device, a type, an instance, and one or more configurations with components of the system, each type, instance, and configuration having its own information page corresponding to a particular component, wherein:
      the type is a general template having corresponding information page that describes the type to which the particular component corresponds;
      the configuration is a specific template including specific information for a particular class of the type;
      the instance is a specific occurrence of the type or the configuration and corresponding to the particular component;
      information contained in information page associated with the instance is more specific or restrictive than the information contained in information pages associated with the configuration, unless instructed otherwise by a user; and
      information contained in information page associated with the configuration is more specific or restrictive than the information contained in information pages associated with the type, unless instructed otherwise by the user;
    the information page includes one or more policies;
  receiving, by the computing device, multiple policies for a part of the model of the system
  for a first policy of the multiple policies:
    identifying, by the computing device, a first part of the model of the system to which the first policy applies;
    associating, by the computing device, the first policy with the identified first part; and
    invoking, by the computing device, a deployment agent to apply the first policy to components of the system corresponding to the identified first part of the model; and
  for a second policy of the multiple policies:
    identifying, by the computing device, a second part of the model of the system to which the second policy applies;
    associating, by the computing device, the second policy with the identified second part; and
    invoking, by the computing device, the deployment agent to apply the second policy to components of the system corresponding to the identified second part of the model,
  wherein:
    the first policy is different from the second policy; and
    the first part of the model is different from the second part of the model.

6. A method as recited in claim 5, wherein all policies that apply to the system are associated with selected parts of the model of the system.

7. A method as recited in claim 5, further comprising performing, by the computing device, management of the system using the model of the system, the management of the system including deploying software to components of the system and monitoring health of the system.

8. A method as recited in claim 5, further comprising maintaining, by the computing device, the model of the system at a central repository.

9. A method as recited in claim 8, further comprising maintaining, by the computing device, at least a portion of the model at selected components of the system.

10. A method as recited in claim 5, further comprising changing, by the computing device, the policy for one part of the model based on one or more other parts of the model.

11. A method as recited in claim 5, wherein identifying parts of the model comprises accessing, by the computing device, information pages associated with components of the model and identifying, from the information in the information pages, the components of the model to which the policy applies.

12. A method as recited in claim 5, wherein identifying parts of the model comprises accessing, by the computing device, relationship information associated with components of the model and identifying, by the computing device, from the relationship information, the components of the model to which the policy applies.

13. A method as recited in claim 5, wherein the model defines one or more relationships among the components.

14. A method as recited in claim 13, wherein the relationships include a containment relationship, a hosting relationship, or a communication relationship.

15. A method comprising:
  associating, by a computing device configured to provide model-based policy functionality, one or more information pages with components of a system to define a model of the system,
    the associating including associating, by the computing device, a type, an instance, and one or more configurations with components of the system, each type, instance, and configuration having its own information page corresponding to a particular component, wherein;
      the type is a general template having corresponding information page that describes the type to which the particular component corresponds;
      the configuration is a specific template including specific information for a particular class of the type;
      the instance is a specific occurrence of the type or the configuration and corresponding to the particular component;
      information contained in information page associated with the instance is more specific or restrictive than the information contained in information pages associated with the configuration, unless instructed otherwise by a user; and
      information contained in information page associated with the configuration is more specific or restrictive than the information contained in information panes associated with the type, unless instructed otherwise by the user;

wherein:

each component comprises at least one of:
- an application,
- a particular hardware on a computer,
- a virtual machine,
- a computer, or
- a group of multiple computers;

each information page represents a specification for an associated component, each information page comprising at least two of following distinct pages:
- a policy page,
- an installation page,
- a constraint page,
- a monitoring page
- a service level agreement page, or
- a description page, the model defines one or more relationships among the components, the relationships including:
- a containment relationship;
- a hosting relationship; or
- a communication relationship; and the model supports deployment of a plurality of policies, wherein each policy applies to a subset of the system such that a system component affected by a first policy is not affected by a second policy;

associating, by the computing device, two or more policies with particular components based on the information in a policy page associated with the particular components, the two or more policies comprising:
- a software deployment policy;
- a software configuration management policy;
- a data protection policy;
- an inventory data policy;
- a health monitoring policy;
- a workload deployment policy; or
- a task execution policy;

making, by the computing device, the model accessible to various utilities or other applications involved in managing the system;

receiving, by the computing device, an indication of a change to a policy of the system;

identifying, by the computing device, appropriate components of the model of the system that are affected by the change, each of the one or more components having an associated policy;

modifying, by the computing device, each policy associated with the identified appropriate components to reflect the change, the modifying comprising adding, deleting, or replacing a changed policy in the policy page; and invoking, by the computing device, a deployment agent to apply the changed policy to the identified appropriate components of the system.

16. A method as recited in claim 15, further comprising:

receiving, by the computing device, an identification of a change to the system, the change to the system being addition of a component to the system;

associating, by the computing device, the policy with one or more parts of the model associated with the added component; and invoking, by the computing device, the deployment agent to apply the policy to the added component in the system.

17. A method as recited in claim 15, wherein identifying appropriate components of the model comprises accessing, by the computing device, information pages associated with components of the model and identifying, from the information in the information pages, one or more components of the model to which the policy applies.

18. A method as recited in claim 15, further comprising changing, by the computing device, the policy for appropriate components of the model based on one or more other parts of the model.

19. A method as recited in claim 15, wherein identifying appropriate components of the model comprises accessing, by the computing device, relationship information associated with components of the model and identifying, from the relationship information, the components of the model to which the policy applies.

20. A method as recited in claim 15, further comprising performing, by the computing device, management of the system using the model of the system, the management of the system including deploying software to components of the system and predicting capacity of the system.

* * * * *